(12) United States Patent
Sasaki

(10) Patent No.: US 10,000,116 B2
(45) Date of Patent: Jun. 19, 2018

(54) FUEL FILLING APERTURE OPENING AND CLOSING DEVICE

(71) Applicant: NIFCO INC., Yokosuka-shi, Kanagawa (JP)

(72) Inventor: Hiroshi Sasaki, Yokosuka (JP)

(73) Assignee: NIFCO INC., Yokosuka-shi, Kanagawa (JP)

( * ) Notice: Subject to any disclaimer, the term of this patent is extended or adjusted under 35 U.S.C. 154(b) by 18 days.

(21) Appl. No.: 15/303,423

(22) PCT Filed: Apr. 6, 2015

(86) PCT No.: PCT/JP2015/060751
§ 371 (c)(1),
(2) Date: Oct. 11, 2016

(87) PCT Pub. No.: WO2015/156253
PCT Pub. Date: Oct. 15, 2015

(65) Prior Publication Data
US 2017/0028841 A1    Feb. 2, 2017

(30) Foreign Application Priority Data

Apr. 11, 2014 (JP) .................. 2014-082155

(51) Int. Cl.
*B60K 15/04* (2006.01)
*F01M 11/04* (2006.01)
(Continued)

(52) U.S. Cl.
CPC .......... *B60K 15/04* (2013.01); *B60K 15/0406* (2013.01); *B67D 7/36* (2013.01);
(Continued)

(58) Field of Classification Search
CPC .... B60K 2015/0483; B60K 2015/0429; B60K 15/04; B60K 2015/0445; B60K 2015/0461
See application file for complete search history.

(56) References Cited

U.S. PATENT DOCUMENTS 2,145,758 A * 1/1939 Fellows ............. B60K 15/0406
220/822
5,730,194 A    3/1998 Foltz
(Continued)

FOREIGN PATENT DOCUMENTS

DE    19543034 A1    5/1997
EP    0657317 A1    6/1995
(Continued)

OTHER PUBLICATIONS

PCT International Search Report of PCT/JP2015/060751 dated Jun. 23, 2015.
(Continued)

*Primary Examiner* — Timothy L Maust
*Assistant Examiner* — Timothy P Kelly
(74) *Attorney, Agent, or Firm* — Manabu Kanesaka

(57) ABSTRACT

Disclosed is an opening and closing device including a closing member which is turned to an opening position by inserting a fuel-filling nozzle to open a fuel-filling aperture. The closing member includes a pair of flap bodies and a biasing device which positions each of the flap bodies in a closing position by a biasing force. The pair of flap bodies each includes a turning assembly portion as the center of the turning and an abutment portion with respect to the other flap body and is each configured to press its front surface portion against a hole edge portion of a passage hole of the
(Continued)

fuel-filling nozzle by the biasing force and presses the abutment portion against the abutment portion of the other flap body.

5 Claims, 13 Drawing Sheets

(51) Int. Cl.
  *B67D 7/36* (2010.01)
  *F16K 1/20* (2006.01)
  *B67D 7/04* (2010.01)
  *B67D 7/42* (2010.01)

(52) U.S. Cl.
  CPC ........... *F01M 11/04* (2013.01); *F16K 1/2021* (2013.01); *B60K 2015/0429* (2013.01); *B60K 2015/0461* (2013.01); *B67D 7/04* (2013.01); *B67D 7/42* (2013.01); *F01M 2011/0416* (2013.01)

(56) References Cited

U.S. PATENT DOCUMENTS

| | | | |
|---|---|---|---|
| 6,102,234 A | 8/2000 | Kremer et al. | |
| 7,461,673 B2* | 12/2008 | Busch | B60K 15/0406 141/348 |
| 9,701,194 B2* | 7/2017 | Groom | B60K 15/04 |
| 2008/0087354 A1 | 4/2008 | Cisternino et al. | |
| 2016/0297297 A1* | 10/2016 | Hirohara | B60K 15/04 |

FOREIGN PATENT DOCUMENTS

| | | |
|---|---|---|
| JP | 4198971 B2 | 12/2008 |
| WO | 2008/048739 A1 | 4/2008 |

OTHER PUBLICATIONS

Europe Patent Office, "Search Report for European Patent Application No. 15777189.0," dated Nov. 24, 2017.

* cited by examiner

FUEL FILLING APERTURE OPENING AND CLOSING DEVICE

TECHNICAL FIELD

The present invention relates to fuel filling aperture opening and closing device which opens a fuel-filling aperture by inserting a fuel-filling nozzle to allow this insertion and automatically closes the fuel-filling aperture when the inserted fuel-filling nozzle has been pulled out.

BACKGROUND ART

As an opening and closing device attached to an upper end of a fuel injection pipe, there is an opening and closing device shown in Patent Literature 1. The opening and closing device includes a shutter-like closing device turned around a turning axis along the center axis of the fuel injection pipe and turns this closing device toward a side of a passage hole of a fuel-filling nozzle by a force applied by the fuel-filling nozzle to open the fuel-filling nozzle. In the device shown in Patent Literature 1, the closing device closes the fuel-filling aperture but does not have a structure biased in a direction in which the closing device is attached firmly to the fuel-filling aperture and is not excellent in sealing property when closing the fuel-filling aperture.

CITATION LIST

Patent Literature

Patent Literature 1: Japanese Patent No. 4198971

SUMMARY OF THE INVENTION

Technical Problem

A main object to be solved by the present invention is that in this kind of a fuel-filling aperture opening/closing device, a sealing property at the time of closing a fuel-filling aperture is made more reliably and better.

Solution to Problem

To achieve the above object, the present invention provides a fuel-filling aperture opening and closing device including a closing member which is turned to an opening position by insertion of a fuel-filling nozzle to open a fuel-filling aperture, wherein the closing member includes a pair of flap bodies and biasing means which positions each of the flap bodies in a closing position by a biasing force, and the pair of flap bodies each includes a turning assembly portion as the center of the turning and an abutment portion with respect to the other flap body and is each configured to press its front surface portion against a hole edge portion of a passage hole of the fuel-filling nozzle by the biasing force and press the abutment portion against the abutment portion of the other flap body.

The closing member presses its front surface portion against the hole edge portion of the passage hole at the closing position, and the abutment portions of the pair of flap bodies are interlocked with a small gap, whereby a closing state of the fuel-filling aperture is maintained with a high sealing property.

In one of preferred aspects of the present invention, the biasing means is a coil spring which abuts at one spring end against a side of a support of the flap body and at the same time abuts at the other spring end against an inclined surface formed at a back surface portion of the flap body and facing a thickness direction of the flap body gradually increasing as it approaches the abutment portion. According to this constitution, the flap body which is subjected to a biasing force of this spring to be moved back to the closing position can be subjected to a force applied in a direction in which the abutment portion of this flap body is pressed against the abutment portion of the other flap body, so that the abutment portions of the pair of flap bodies can be interlocked with a small gap at the closing position.

Further, in one of the preferred aspects of the present invention, in the flap body, a shaft body provided on one of the support and the turning assembly portion of the flap body is retained in a shaft hole provided in the other of the support and the turning assembly portion with a room, so that the flap body is turnably supported.

Further, in one of the preferred aspects of the present invention, the flap body includes at its back surface portion a guide surface which, when timing of moving back to the closing position due to the biasing force is changed between the pair of flap bodies, is in contact with a portion of the other flap body to guide the other flap body to the closing position.

Further, in one of the preferred aspects of the present invention, the flap body includes at its front surface portion a groove-shaped recess having a circular arc cross-sectional shape in a direction parallel to the center axis of the turning. In such case, when the fuel-filling nozzle is not inserted in a direction in which the center axis of the fuel-filling nozzle to be inserted coincides with the center axis of the fuel-filling aperture, an end of the fuel-filling nozzle can be guided to have a direction by the groove-shaped recess.

Advantageous Effects of Invention

According to the present invention, the sealing property at the time of closing of the fuel-filling aperture can be made reliably and well by the pair of flap bodies.

DESCRIPTION OF EMBODIMENTS

Hereinafter, a typical embodiment of the present invention will be described based on FIGS. 1 to 14. A fuel-filling aperture opening/closing device according to the embodiment opens a fuel-filling aperture by inserting a fuel-filling nozzle N to allow this insertion and automatically closes the fuel-filling aperture when the inserted fuel-filling nozzle N has been pulled out.

Namely, when the fuel-filling nozzle N of a fuel-filling gun (not shown) is inserted into a fuel-filling aperture, the above fuel-filling aperture opening/closing device turns the undermentioned closing members La and Ua to an opening position to allow an insertion of the fuel-filling nozzle N further than the fuel-filling aperture opening/closing device and thus to enable fuel filling. When the inserted fuel-filling nozzle N has been pulled out, the undermentioned closing members La and Ua are moved back to a closing position to automatically close the fuel-filling aperture. Consequently, in this fuel-filling aperture opening/closing device, a screw cap of a fuel-filling aperture is not required.

Figure 4:
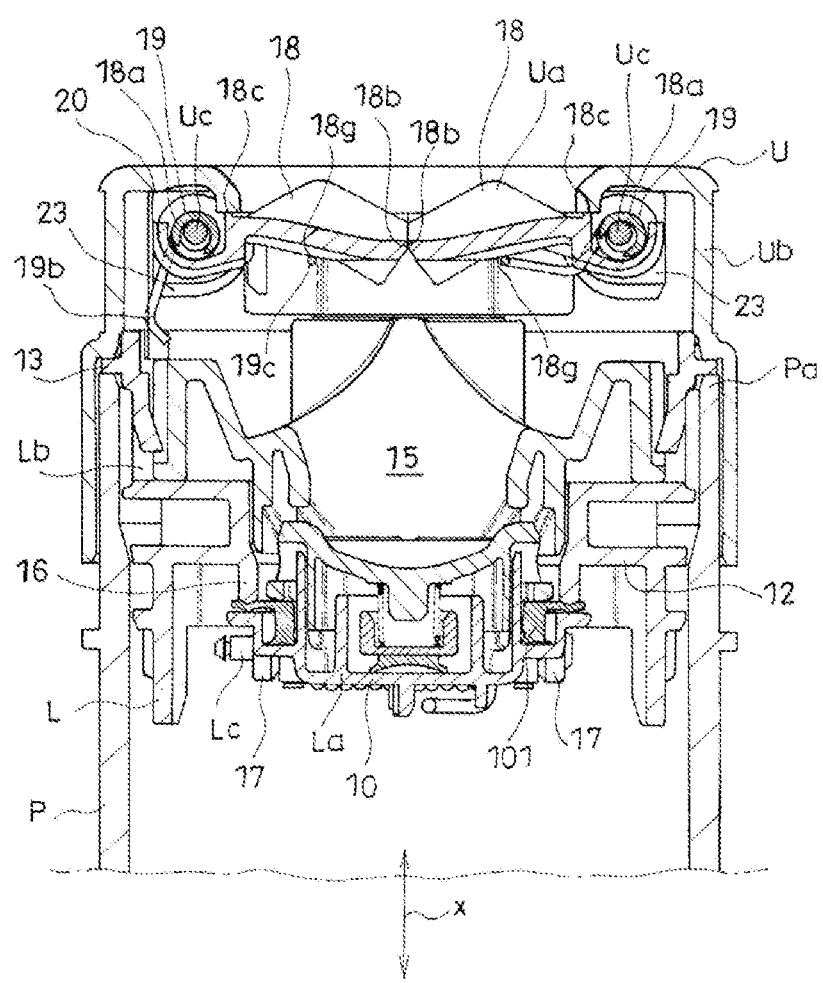
FIG. 4 is a cross-sectional view taken along a line A-A shown in FIG. 2.

In the illustrated example, the fuel-filling aperture opening/closing device is attached to an upper end Pa of an inlet pipe P (fuel injection pipe) constituting the fuel-filling aperture (see FIG. 4). In the illustrated example, two types of fuel-filling aperture opening/closing devices having different functions are attached to the upper end Pa of the inlet pipe P. One of the two types of fuel-filling aperture opening/closing devices (hereinafter, this fuel-filling aperture opening/closing device is referred to as a lower device L) is embedded inside the upper end Pa of the inlet pipe P. The other fuel-filling aperture opening/closing device (hereinafter referred to as an upper device U) is fitted in the outside of the upper end Pa of the inlet pipe P from a state in which the lower device L is embedded inside the upper end Pa of the inlet pipe P. According to this constitution, the closing member Ua of the upper device U is located directly above the closing member La of the lower device L. When the operation of inserting the fuel-filling nozzle N is performed, the fuel-filling nozzle N abuts against the closing member Ua of the upper device U to turn the closing member Ua to the opening position and thus to enter inside of the fuel-filling aperture. Subsequently, the fuel-filling nozzle N abuts against the closing member La of the lower device L to turn the closing member La to the opening position and thus to completely open the fuel-filling aperture.

(Lower Device L)

Figure 7:
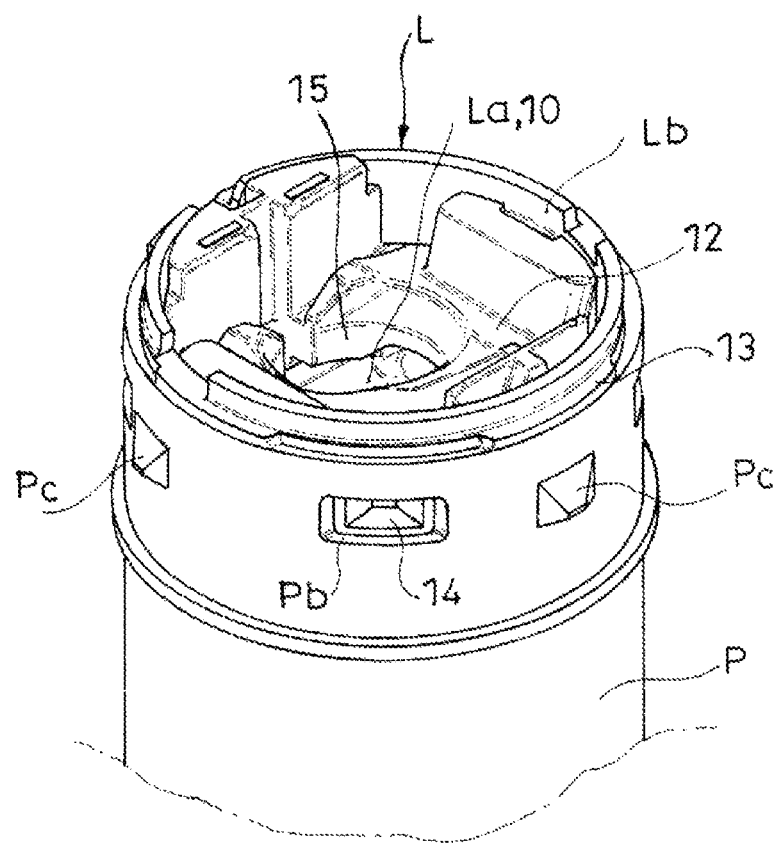
FIG. 7 is a perspective view showing a state in which a lower device is attached to the inlet pipe, while omitting illustration of the upper device.
Figure 8:
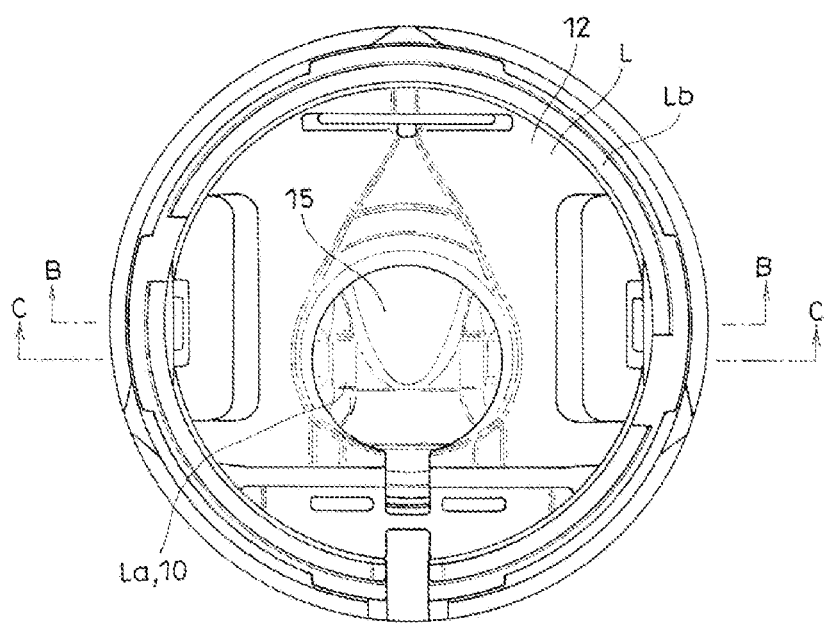
FIG. 8 is a plan view of the state shown in FIG. 7.

The lower device L is provided with a cylindrical main body Lb and the closing member La (see FIG. 7). The cylindrical main body Lb opens both an upper end and a lower end and substantially presents a cylindrical shape. An inner space of the cylindrical main body Lb is vertically divided by a bulkhead 12 between the upper end and the lower end. An outer diameter of the cylindrical main body Lb is substantially equal to an inner diameter of the upper end Pa of the inlet pipe P. In the illustrated example, an outer flange 13 is formed at the upper end of the cylindrical main body Lb, and an engaging projection 14 is formed on an outer surface portion of the cylindrical main body Lb. The upper end Pa of the inlet pipe P has an engagement hole Pb receiving the engaging projection 14 of the cylindrical main body Lb in a process for embedding the lower device L inside the upper end Pa of the inlet pipe P to a position where the outer flange 13 abuts against a terminal of the inlet pipe P, and the engagement hole Pb is engaged with the engaging projection 14 by elastic return at an embedding finish position. The embedding state of the lower device L with respect to the inlet pipe P is maintained by this engagement. The bulkhead 12 has a circular passage hole 15 allowing passage of the fuel-filling nozzle N. The closing member La is in pressure contact with the bulkhead 12 from below at the closing position to close the passage hole 15 and thus to maintain a closed state of the fuel-filling aperture unless the fuel-filling nozzle N is inserted (see FIG. 4).

Figure 9:
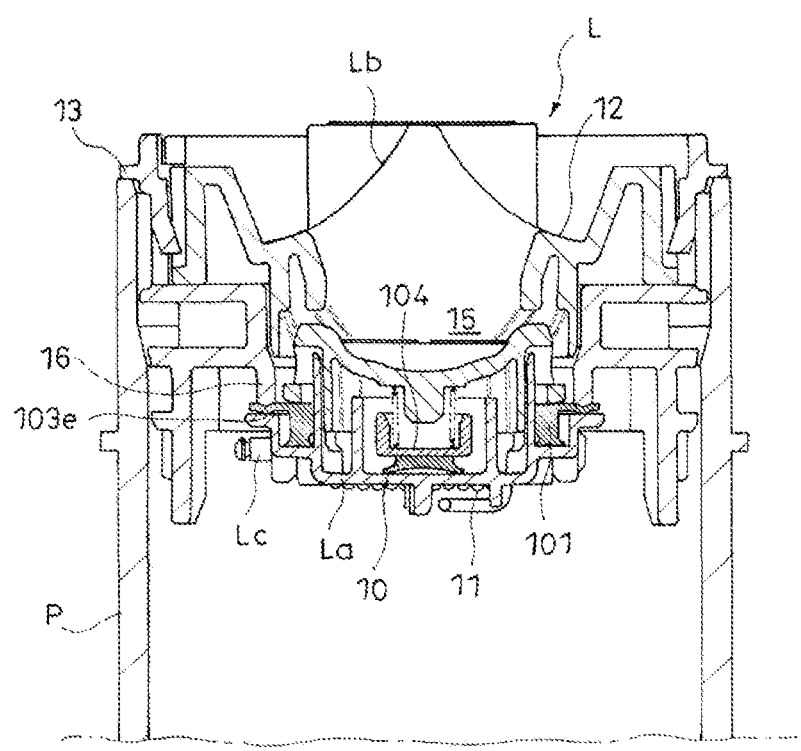
FIG. 9 is a cross-sectional view taken along a line B-B shown in FIG. 8.

On the lower surface side of the bulkhead 12, the hole edge portion of the passage hole 15 is rimmed by a protrusion 16 (see FIG. 9). Namely, a short dimensional cylindrical portion is formed on the lower surface of the bulkhead 12 by the protrusion 16. The closing member La is configured to bring a plate-shaped portion 101b (shown in FIG. 10) of the undermentioned seal member 101 into press contact with the protrusion 16 by a biasing force of the undermentioned biasing means 11 (shown in FIG. 3) at the closing position to close the passage hole 15 in an airtight manner. Namely, in this embodiment, the protrusion 16 functions as a valve seat.

On the other hand, the closing member La is provided with a flap body 10 provided with the ring-shaped seal member 101 and the biasing means 11 positioning the flap body 10 in the closing position by the biasing force.

Figure 10:
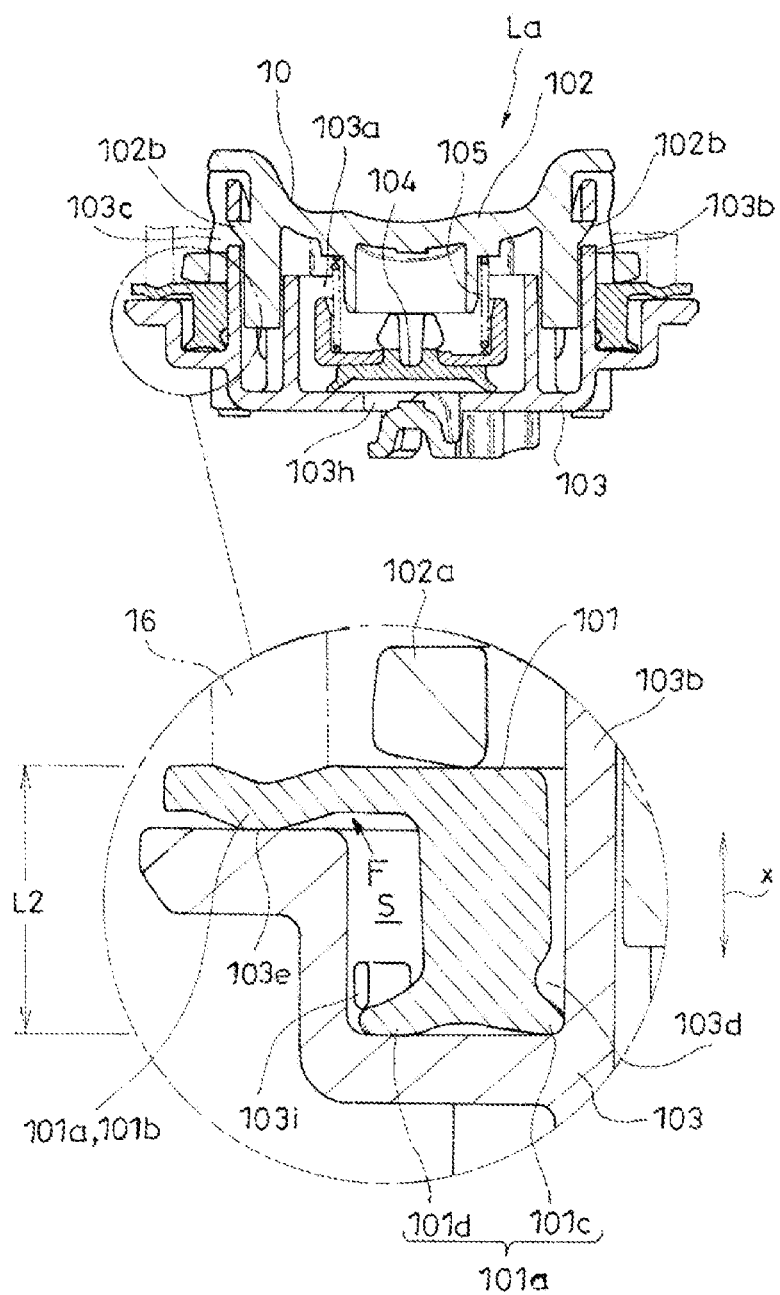
FIG. 10 is a cross-sectional view of the flap body constituting the lower device in a position of a line C-C shown in FIG. 8 and shows a protrusion, which rims a passage hole, with an imaginary line.
Figure 11:
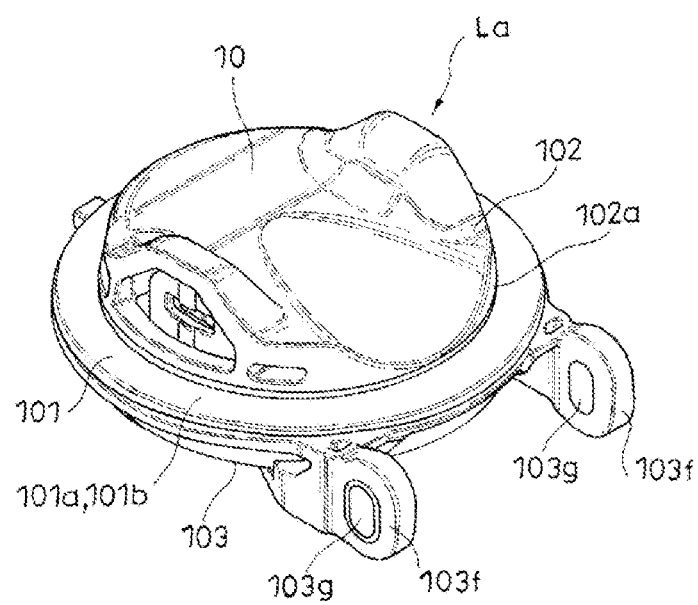
FIG. 11 is a perspective view of the flap body constituting the lower device.
Figure 12:
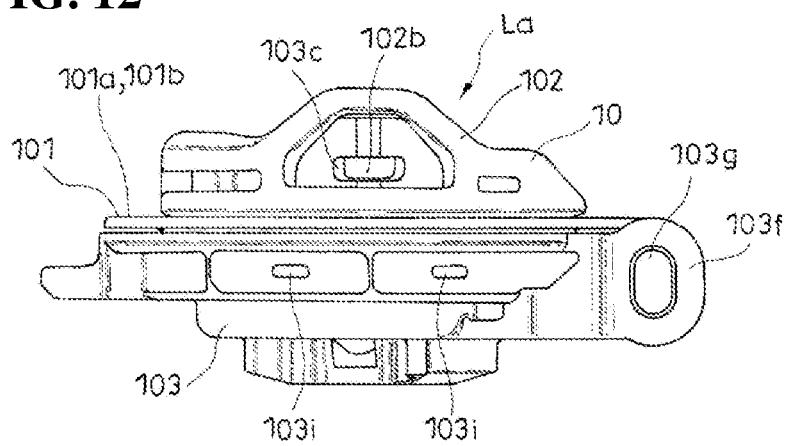
FIG. 12 is a side view of the flap body constituting the lower device.
Figure 13:
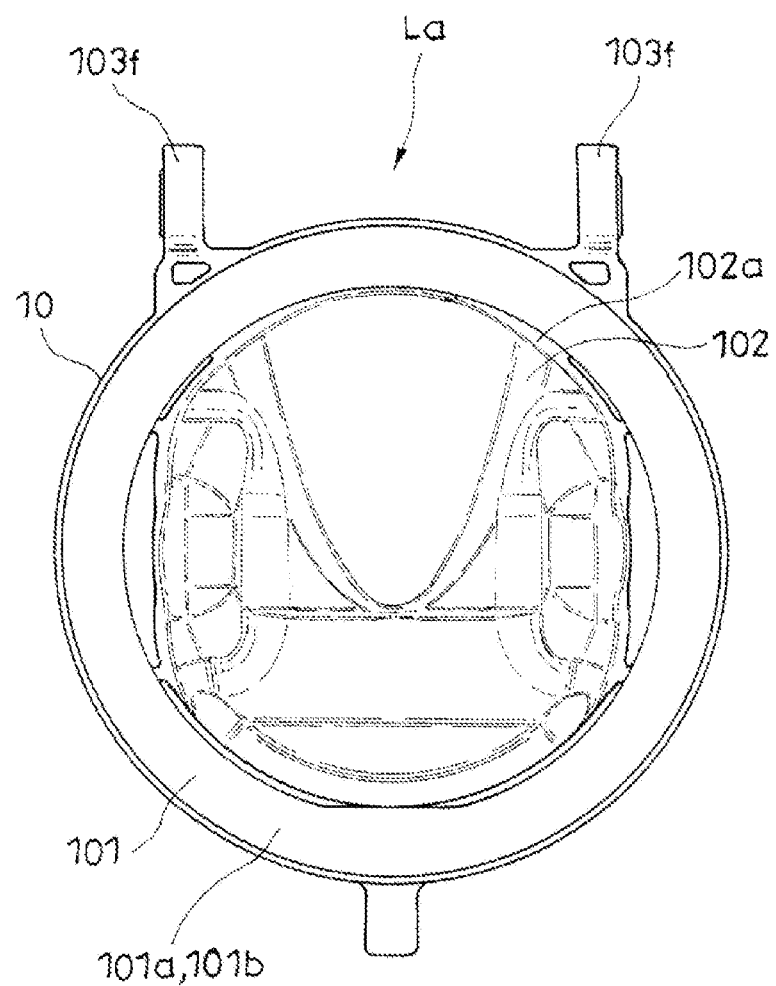
FIG. 13 is a plan view of the flap body constituting the lower device.

The flap body 10 is constituted of an outer member 102 and an inner member 103 combined through the seal member 101 (see FIGS. 10 to 12). The outer member 102 is located on the terminal side of the inlet pipe P, and the inner member 103 is located on a depth side of the inlet pipe P.

The inner member 103 substantially presents a disc shape. The inner member 103 has on its front surface side an inside circular wall 103a, an outside circular wall 103b surrounding the inside circular wall 103a, and a circular groove 103d surrounding the outside circular wall 103b (see FIG. 10). A circular flat surface 103e is formed between the circular groove 103d and an outer edge of the inner member 103.

On the other hand, the inner member 103 has a pair of bearing portions 103f, 103f on its back surface side (see FIG. 11). The pair of bearing portions 103f, 103f each has an arm shape protruding from the back surface side of the inner member 103, and a protruding end is positioned outer side than the outer edge of the inner member 103 and provided with a shaft hole 103g. In the illustrated example, a pair of bearing portions 17, 17 is formed below the bulkhead 12 of the cylindrical main body Lb (see FIG. 3). In the illustrated example, the pair of bearing portions 103f, 103f of the inner member 103 is stored between the pair of bearing portions 17, 17 of the cylindrical main body Lb, and, at the same time, a shaft body Lc is inserted through the shaft holes 103g formed in the pair of bearing portions 103f, 103f, whereby the closing member La is attached to the cylindrical main body Lb so as to be turnable about the shaft body Lc.

The outer member 102 has a size fitting into the passage hole 15 in a state in which the flap body 10 is located at the closing position, and the outer member 102 has a circular outline shape (see FIG. 11). The fuel-filling nozzle N abuts against a front surface of the outer member 102. The outer member 102 has a circular clipping portion 102a on its back surface side (see FIG. 10). Engagement claws 102b protruding outward on both sides in a diameter direction of the outer member 102 are each formed at a side portion of the outer member 102, that is, above the circular clipping portion 102a.

In the illustrated example, the outer member 102 and the inner member 103 are integrated with each other by engaging the engagement claw 102b of the outer member 102 with an engagement hole 103c formed in the outside circular wall 103b of the inner member 103 in such a state that the circular clipping portion 102a of the outer member 102 is located directly above the circular groove 103d of the inner member 103, and, at the same time, the circular flat surface 103e of the inner member 103 is positioned outward an outer edge of the outer member 102.

In the illustrated example, a ventilation hole 103h is formed inward the inside circular wall 103a of the inner member 103, and a compression coil spring 105 and a valve body 104 closing the ventilation hole 103h by a biasing force of the spring 105 are stored between the inner member 103 and the outer member 102. When a side of a fuel tank becomes a high pressure with a predetermined value or above, the valve body 104 rises against the biasing force of the spring 105 to open the ventilation hole 103h. Namely, in the illustrated example, the flap body 10 incorporates a relief valve.

On the other hand, the seal member 101 is provided with seal portions 101a on the inner and outer peripheral sides, and the seal portions 101a are provided to insert a space S (shown in FIG. 10) between the inner and outer seal portions 101a, 101a through the depth side of the inlet pipe P. Typically, the seal member 101 is formed of rubber or plastic having rubber-like elasticity.

In the seal member 101, one of the inner and outer seal portions 101a, 101a is the plate-shaped portion 101b brought into press contact with the protrusion 16 by the biasing force, the protrusion 16 rimming the hole edge portion of the passage hole 15 of the fuel-filling nozzle N. The other of the inner and outer seal portions 101a, 101a is constituted of an inside circular protrusion 101c and an outside circular protrusion 101d which are in press contact with the flap body 10.

In this embodiment, an outer diameter of the seal member 101 is substantially equal to an outer diameter of the inner member 103, and an inner diameter of the seal member 101 is substantially equal to the outer diameter of the outside circular wall 103b. Further, in this embodiment, the seal member 101 has the plate-shaped portion 101b on its outer peripheral side and has the inside circular protrusion 101c and the outside circular protrusion 101d on its inner peripheral side.

More specifically, the seal member 101 presents a substantially L-shaped cross-sectional shape including a portion perpendicular to an axial direction x (see FIGS. 4 and 10) of the inlet pipe P and a portion along the axial direction x of the inlet pipe P (see FIG. 10). In the seal member 101, a part of the portion perpendicular to the axial direction x is the plate-shaped portion 101b, and the seal member 101 is provided with the inside circular protrusion 101c and the outside circular protrusion 101d at a terminal of a portion along the axial direction.

Figure 14:
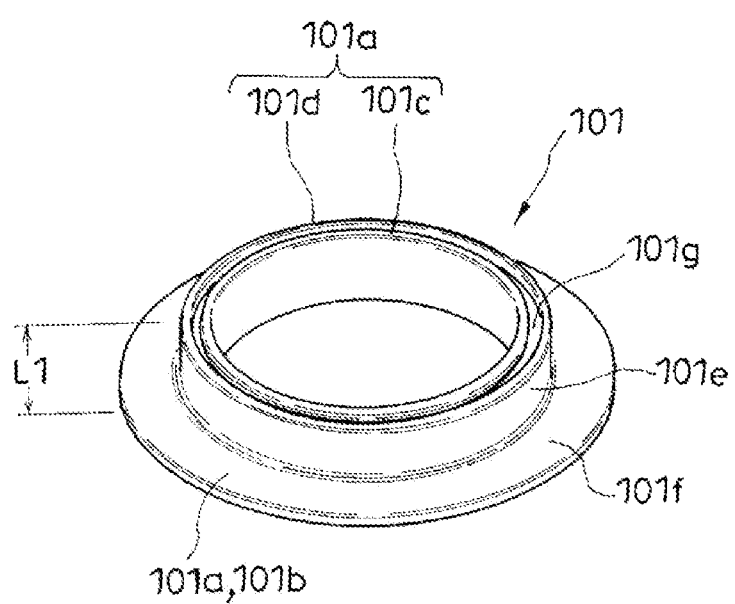
FIG. 14 is a perspective view of a seal member constituting the lower device as viewed from the side of the inlet pipe.

In the illustrated example, the seal member 101 is formed such that while a circular outer flange 101f as the plate-shaped portion 101b is formed at one cylinder end of a short cylindrical body 101e, a circular groove 101g is formed at the other cylinder end of the short cylindrical body 101e. The outside circular protrusion 101d and the inside circular protrusion 101c are formed by the other cylinder end of the short cylindrical body 101e sectioned into inside and outside by the circular groove 103d (FIG. 14).

A length L1 (shown in FIG. 14) of the short cylindrical body 101e of the seal member 101 is larger than a distance L2 (shown in FIG. 10) between the circular clipping portion 102a of the outer member 102 and a groove bottom of the circular groove 103d of the inner member 103.

In this embodiment, the short cylindrical body 101e is stored in the circular groove 103d of the inner member 103, and the seal member 101 is combined with the inner member 103 so that the outer flange 13 is positioned on the circular flat surface 103e. From this state, the outer member 102 is combined with the inner member 103 as described above, whereby the seal member 101 is held between the inner member 103 and the outer member 102. Consequently, the plate-shaped portion 101b of the seal member 101 is positioned outward the outer member 102, and the inside circular protrusion 101c and the outside circular protrusion 101d of the seal member 101 are positioned between the inner member 103 and the outer member 102.

The inside circular protrusion 101c of the seal member 101 is in press contact with the groove bottom of the circular groove 103d while being elastically deformed to be narrowed inward, and the outside circular protrusion 101d is in press contact with the groove bottom of the circular groove 103d while being elastically deformed to extend outward. The plate-shaped portion 101b is held between the protrusion 16 and the circular flat surface 103e while being bent by the protrusion 16 such that the upper side is a bent inner side (FIG. 10).

Figure 3:
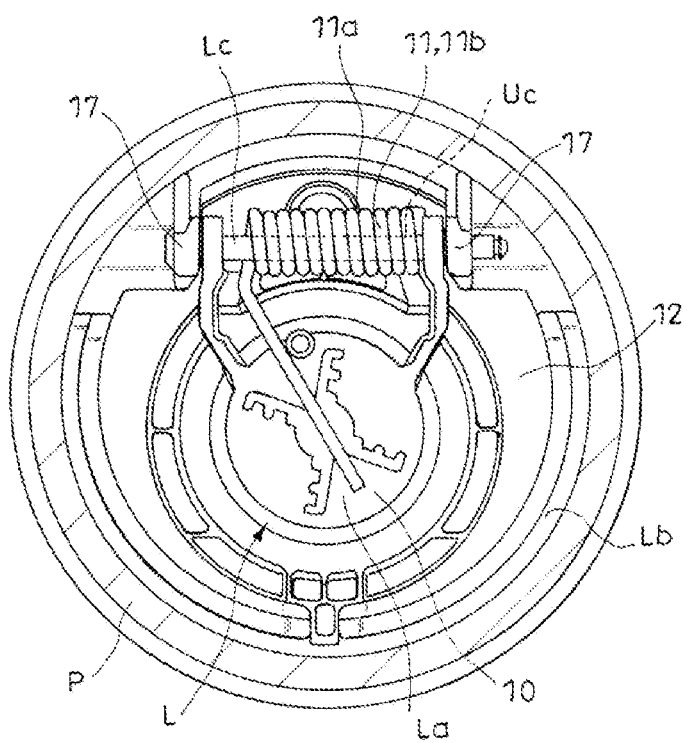
FIG. 3 is a bottom view of the state shown in FIG. 1.

The biasing means 11 is a coil spring 11a in the illustrated example (see FIG. 3). In the illustrated example, the shaft body Lc passes through a spring wound portion 11b between the pair of bearing portions 103f, 103f of the inner member 103 to have one spring end of the coil spring 11a, held with the spring wound portion 11b, abut against the back surface side of the inner member 103, and, at the same time, abut the other spring end of the spring against the bulkhead 12, whereby the biasing force applied toward the closing position is always applied to the flap body 10.

Further, in this embodiment, the inner member 103 has a communication hole 103i for inserting the space S between the inner and outer seal portions 101a, 101a through the depth side of the inlet pipe P. In the illustrated example, the communication hole 103i extending to a groove wall outside of the circular groove 103d of the inner member 103 (see FIG. 10), whereby the space S between the plate-shaped portion 101b and the outside circular protrusion 101d is in a state of being communicated with the depth side of the inlet pipe P, that is, the fuel tank side.

When the flap body 10 constituting the closing member La is at the closing position, the plate-shaped portion 101b which is one of the inner and outer seal portions 101a, 101a of the seal member 101 is brought into press contact with the protrusion 16 by the biasing force, and the biasing force is concentrated on a relatively narrow press-contact portion with respect to the protrusion 16; therefore, the sealing property of the plate-shaped portion 101b is maintained high. In a case where the protrusion 16 is not provided, if the seal member 101 is swollen by a fuel, although a seal portion where the seal member 101 is in contact with the hole edge portion of the passage hole 15 may change, the seal portion is not changed by the protrusion 16 even if the swelling or the like occurs.

Since the other of the inner and outer seal portions 101a, 101a of the seal member 101 is constituted of the inside circular protrusion 101c and the outside circular protrusion 101d, not only when the depth side of the inlet pipe P is a high pressure, but also when the outside of the inlet pipe P is a high pressure, a circular protrusion located on the high pressure side in the inside circular protrusion 101c and the outside circular protrusion 101d is brought into press contact with the flap body 10 by a pressure difference, whereby the sealing property between the seal member 101 and the flap body 10 can be enhanced.

In the illustrated example, the seal member 101 communicates the space S between the inner and outer seal portions 101a, 101a through the depth side of the inlet pipe P, and while the outside circular protrusion 101d is in press contact with the groove bottom of the circular groove 103d while being elastically deformed to extend outward, the inside circular protrusion 101c is in press contact with the groove bottom of the circular groove 103d while being elastically deformed to be narrowed inward (see FIG. 10). Therefore, when the depth side of the inlet pipe P is a high pressure, the outside circular protrusion 101d is brought into press contact with the flap body 10 (the groove bottom of the circular groove 103d) by this pressure to enhance the sealing property between the seal member 101 and the flap body 10. On the other hand, when the outside of the inlet pipe P is a high pressure, the inside circular protrusion 101c is brought into press contact with the flap body 10 (the groove bottom of the circular groove 103d) by this pressure to enhance the sealing property between the seal member 101 and the flap body 10.

In this embodiment, the plate-shaped portion 101b is held between the protrusion 16 and the circular flat surface 103e while being bent by the protrusion 16 such that the upper side is the bent inner side, and when the depth side of the inlet pipe P is a high pressure, a force F in FIG. 10 is applied to a terminal of the plate-shaped portion 101b. Consequently, in this embodiment, when the depth side of the inlet pipe P is a high pressure, the plate-shaped portion 101b of the seal member 101 is deformed in a direction in which adhesiveness with respect to the protrusion 16 rimming the hole edge portion of the passage hole 15 is enhanced.

(Upper Device U)

Figure 1:
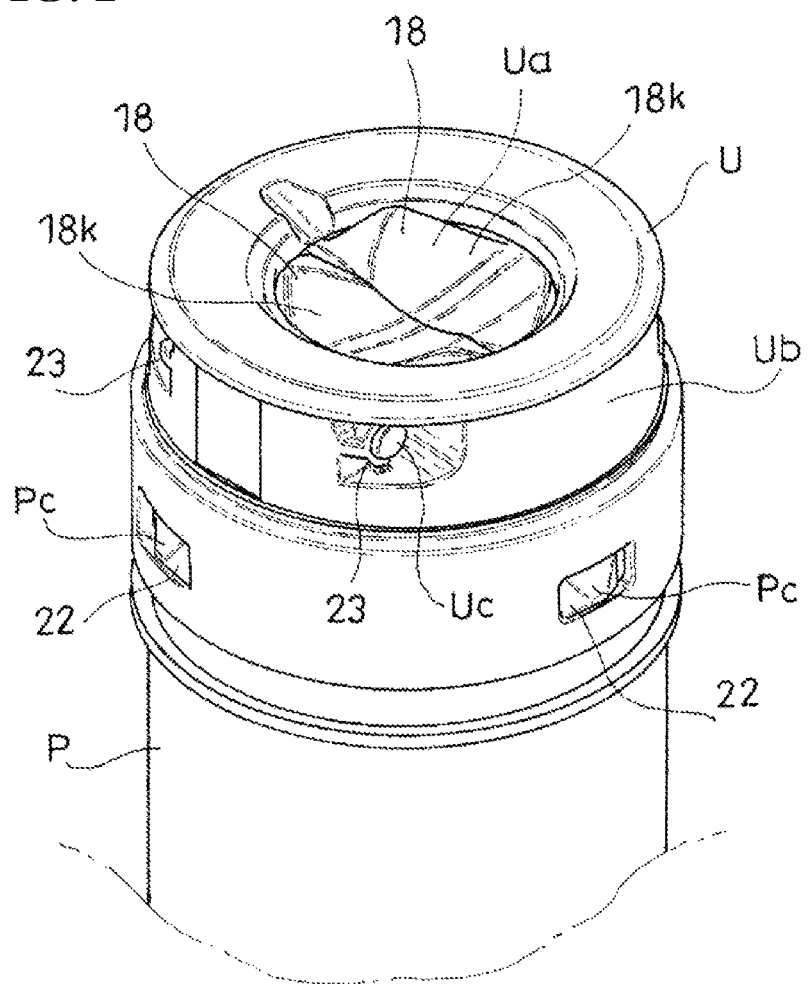
FIG. 1 is a perspective view showing a state in which a fuel-filling aperture opening/closing device according to one embodiment of the present invention is attached to an upper end of an inlet pipe.
Figure 2:
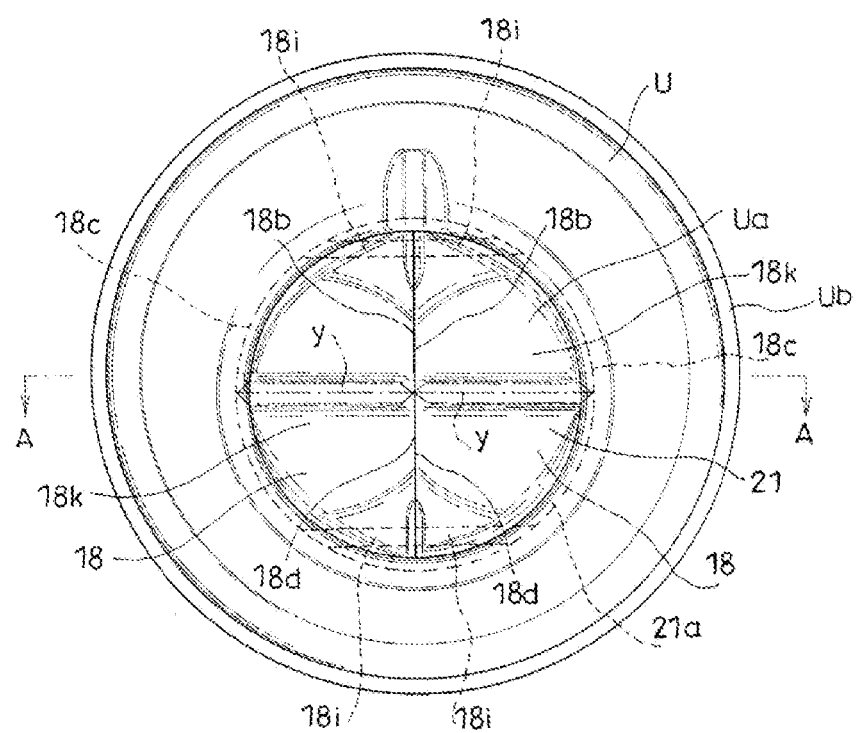
FIG. 2 is a plan view of the state shown in FIG. 1.

The upper device U is provided with a cylindrical main body Ub and the closing member Ua (see FIG. 1). The cylindrical main body Ub opens a lower end and has at its upper end an inner flange 20 having a circular shape, and an upper end opening which is a passage hole 21 of the fuel-filling nozzle N is narrowed by the inner flange 20 (see FIG. 5). Namely, the cylindrical main body Ub presents a substantially cylindrical shape. An inner diameter of the cylindrical main body Ub is substantially equal to an outer diameter of the upper end Pa of the inlet pipe P. In the illustrated example, an engagement hole 22 is formed in an outer surface portion of the cylindrical main body Ub (see FIG. 1). The inlet pipe P has at the upper end Pa an engaging projection Pc which allows the upper end Pa of the inlet pipe P to be received in the cylindrical main body Ub and is engaged with the engagement hole 22 by elastic return when the upper device U is settled in the upper end Pa of the inlet pipe P (see FIG. 7), and an embedding state of the upper device U with respect to the inlet pipe P is maintained by this engagement (see FIG. 1). The closing member Ua is in pressure contact with the inner flange 20 from below at the closing position to close the passage hole 21 and thus to maintain a closed state of the fuel-filling aperture unless the fuel-filling nozzle N is inserted (see FIG. 4).

On the other hand, the closing member Ua is provided with a pair of flap bodies 18, 18 and biasing means 19 positioning each of the flap bodies 18 in the closing position by the biasing force (see FIG. 4).

Each of the pair of flap bodies 18, 18 is provided with a turning assembly portion 18a as the center of the turning and an abutment portion 18b with respect to the other flap body 18 of the pair and configured to press its front surface portion against a hole edge portion 21a of the passage hole 21 of the fuel-filling nozzle N by the biasing force and press the abutment portion 18b against the abutment portion 18b of the other flap body 18 of the pair.

In the illustrated example, the passage hole 21 presents a circular shape. Each of the flap bodies 18 is a plate-shaped body having a semicircular shape in plan view and provided with a semicircular arc edge portion 18c along a circular arc corresponding to 180 degrees of a virtual circle (not shown) having an outer diameter slightly larger than the hole diameter of the passage hole 21 and a linear edge portion 18d along a virtual segment (not shown) dividing the virtual circle into two parts and passing through the center of the virtual circle (see FIG. 2). The pair of flap bodies 18, 18 is configured to press each of the semicircular arc edge portions 18c against the hole edge portion 21a of the passage hole 21 from below by the biasing force and, at the same time, presses the linear edge portion 18d of one of the flap bodies 18 against the linear edge portion 18d of the other flap body 18 to close the passage hole 21 in cooperation with the other flap body 18 (FIG. 4).

Figure 6:
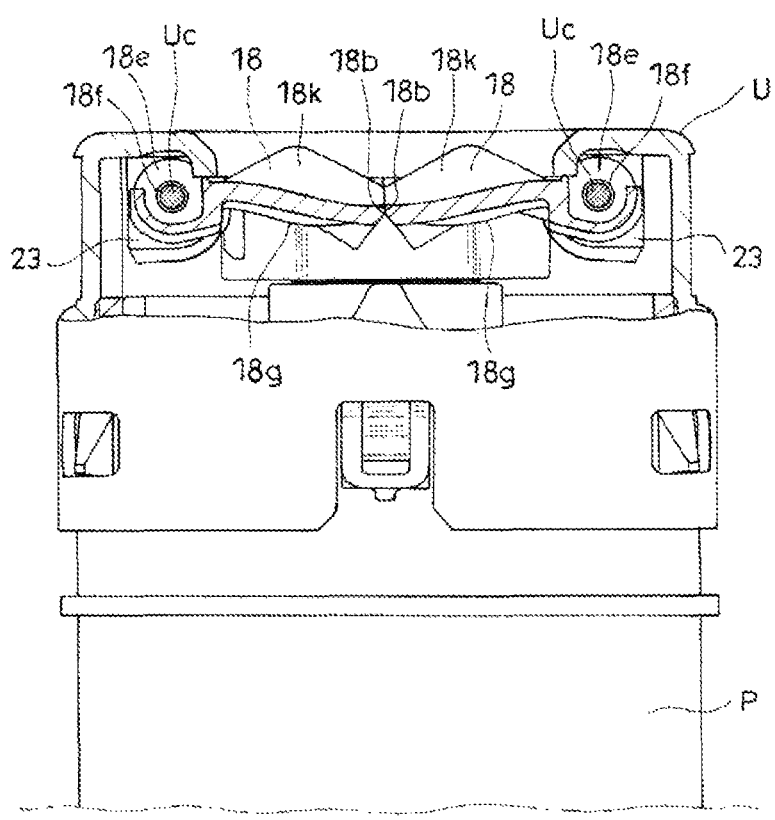
FIG. 6 is a cutaway side view showing a relevant portion of the upper device in cross section, wherein illustration of biasing means of a flap body of the upper device is omitted.

Each of the flap bodies 18 has a pair of bearing portions 18e, 18e (see FIG. 6). Each of the pair of bearing portions 18e, 18e has an arm shape protruding outward from the semicircular arc edge portion 18c in a direction perpendicular to the linear edge portion 18d and has a shaft hole 18f at a protruding end. In the illustrated example, a pair of bearing portions 23, 23 is formed below the inner flange 20 of the cylindrical main body Ub. In the illustrated example, the pair of bearing portions 18e, 18e of the flap body 18 is stored between the pair of bearing portions 23, 23 of the cylindrical main body Ub, and, at the same time, a shaft body Uc is inserted through the shaft holes 18f formed in the pair of the bearing portions 18e, 18e, whereby the flap body 18 is attached to the cylindrical main body Ub so as to be turnable about the shaft body Uc. The axial center line of the shaft body Uc is parallel to the linear edge portion 18d.

Figure 5:
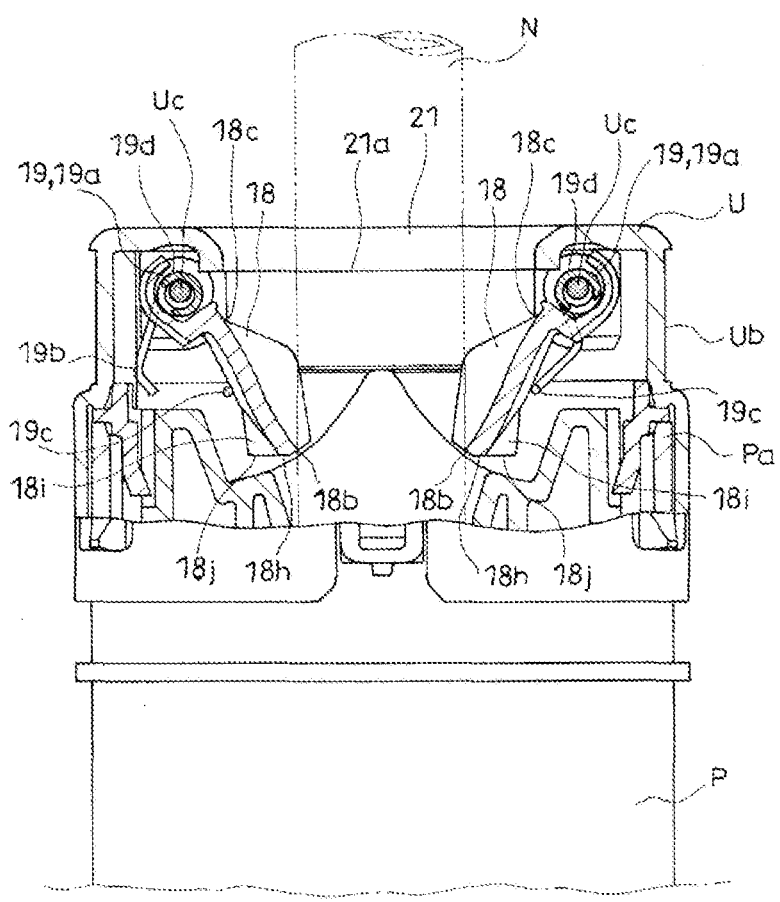
FIG. 5 is a cutaway side view of a relevant portion showing an inserted state of a fuel-filling nozzle, wherein a closing member of an upper device is located at an opening position.

On the other hand, the biasing means 19 is a coil spring 19a which abuts at one spring end 19b against a side of a support of the flap body 18, that is, the cylindrical main body Ub and at the same time abuts at the other spring end 19c against an inclined surface 18g formed at a back surface portion of the flap body 18 and facing in a direction in which a thickness of the flap body 18 is gradually increased as it approaches the abutment portion 18b (see FIGS. 4 and 5). In the illustrated example, the shaft body Uc passes through a spring wound portion 19d between the pair of bearing portions 18e, 18e of the flap body 18 to have the other spring end 19c of the coil spring 19a, held with the spring wound portion 19d, abut against the back surface side of the flap body 18, and, at the same time, have one spring end 19b of the spring 19a abut against an inner wall of the cylindrical main body Ub, whereby the biasing force applied toward the closing position is always applied to the flap body 18.

In this embodiment, in the front surface portion of the flap body 18, a portion except for the semicircular arc edge portion 18c is formed into a substantially recessed shape whose bottom is a portion located on a virtual straight line y (shown in FIG. 2) connecting a midpoint in a length direction of the semicircular arc edge portion 18c and a midpoint in a length direction of the linear edge portion 18d.

In response to the shape of the front surface portion, in the back surface portion of the flap body 18, a portion except for the semicircular arc edge portion 18c is formed into a substantially projecting shape whose top is a portion located on the virtual straight line y connecting the midpoint in the length direction of the semicircular arc edge portion 18c and the midpoint in the length direction of the linear edge portion 18d. In the illustrated example, the inclined surface 18g is formed at the portion located on the virtual straight line in the back surface portion of the flap body 18.

In the illustrated example, the inclined surface 18g starts from the semicircular arc edge portion 18c and ends at the midpoint in the length direction of the virtual straight line y (see FIG. 4). The abutment portion 18b is a vertical surface along the axial direction x of the inlet pipe P and is formed over the entire length of the linear edge portion 18d.

The flap body 18 stores the shaft body Uc in the shaft hole 18f provided in the bearing portion 18e of the flap body 18 with room and is turnably supported by the cylindrical main body Ub as the support. Namely, an inner diameter of the shaft hole 18f is larger than an outer diameter of the shaft body Uc (see FIG. 6).

Since the other spring end 19c of the coil spring 19a abuts against the inclined surface 18g, a force applied in a direction in which the abutment portion 18b is pressed against the abutment portion 18b of the other flap body 18 of the pair is applied to the flap body 18 subjected to the biasing force of the spring 19a to be moved back to the closing position. Consequently, in this embodiment, the abutment portions 18b of the pair of flap bodies 18, 18 are interlocked with a small gap at the closing position (see FIG. 4).

In this embodiment, the flap body 18 has at its back surface portion a guide surface 18h which, when timing of moving back to the closing position due to the biasing force is altered between the pair of flap bodies 18, 18, is in contact with a portion of the other flap body 18 to guide the other flap body 18 to the closing position (see FIG. 5). In the illustrated example, the guide surface 18h inclined in a direction in which a wall thickness of the flap body 18 is gradually increased as it is away from the abutment portion 18b is formed on the lower side of the abutment portion 18b over substantially the entire length of the linear edge portion 18d. In the illustrated example, a mountain-shaped rib 18i is formed between the guide surface 18h and a corner between the linear edge portion 18d and the semicircular arc edge portion 18c, and one of hypotenuses of the rib 18i is an extending guide surface 18j continuous with the guide surface 18h.

In this embodiment, the front surface portion of the flap body 18 is formed into a recessed shape as described above, and a groove-shaped recess 18k having a circular arc cross-sectional shape is formed at the front surface portion in a direction parallel to the center axis of the turning. In the illustrated example, a height of a bottom of the groove-shaped recess 18k is reduced as it approaches the abutment portion 18b. According to this constitution, in this embodiment, when the fuel-filling nozzle N is not inserted in a direction in which the center axis of the fuel-filling nozzle N to be inserted coincides with the center axis of the fuel-filling aperture, that is, the center axis of the inlet pipe P, the end of the fuel-filling nozzle N is guided to have the direction by the groove-shaped recess 18k.

Incidentally, obviously, the present invention is not limited to the above-described embodiments and includes all embodiments which can achieve the object of the present invention.

REFERENCE SIGNS LIST

N fuel-filling nozzle
18 flap body
18a turning assembly portion
18b abutment portion
19 biasing means
21 passage hole
21a hole edge portion Incidentally, all contents of the specification, claims, drawings, and abstract of Japanese Patent Application No. 2014-082155 filed on Apr. 11, 2014 are cited in their entireties herein and are incorporated as a disclosure of the specification of the present invention.

What is claimed is:

1. A fuel-filling aperture opening and closing device comprising:
   a closing member which is turned to an opening position by insertion of a fuel-filling nozzle to open a fuel-filling aperture,
   wherein the closing member comprises a pair of flap bodies and two coil springs, each coil spring being attached to each of the flap bodies and positioning each of the flap bodies in a closing position by a biasing force, and
   the pair of flap bodies each comprises a turning assembly portion as a center of turning, an abutment portion at a side opposite to the turning assembly portion, and an inclined surface formed at a back surface portion of the flap body gradually projecting in one direction as it approaches the abutment portion, the pair of flap bodies being configured to press against a hole edge portion of a passage hole of the fuel-filling nozzle and press each other at the abutment portions by the biasing forces, and
   each of the coil springs has a first spring end abutting against a side of a support of each the flap bodies, and a second spring end abutting against the inclined surface formed at the back surface portion of each of the flap bodies.

2. The fuel-filling aperture opening and closing device according to claim 1, wherein in each flap body, a shaft body provided on one of the support and the turning assembly portion is retained in a shaft hole provided in another of the support and the turning assembly portion to store the shaft body so that each flap body is turnably supported by the support.

3. The fuel-filling aperture opening and closing device according to claim 1, wherein each flap body includes at the back surface portion thereof a guide surface so that when timing of moving back to the closing position due to the biasing force is changed between the pair of flap bodies, the guide surface of one flap body contacts a portion of another flap body to guide the another flap body to the closing position.

4. The fuel-filling aperture opening and closing device according to claim 1, wherein each flap body includes at a front surface portion thereof a groove-shaped recess having a circular arc cross-sectional shape in a direction parallel to the center of turning.

5. The fuel-filling aperture opening and closing device according to claim 4, wherein each flap body has a projecting shape projecting downwardly at the back surface portion opposite to the groove-shaped recess, the projecting shape forming the inclined surface.

* * * * *